US006958118B2

(12) United States Patent
Hill et al.

(10) Patent No.: US 6,958,118 B2
(45) Date of Patent: Oct. 25, 2005

(54) SELF-CLEANING WATER FILTRATION SYSTEM AND METHOD

(75) Inventors: Ronald G. Hill, Chandler, AZ (US); John Johnson, Tempe, AZ (US); Michael Wheat, Tempe, AZ (US)

(73) Assignee: MAAX, Inc., Montreal ( * ) Notice: Subject to any disclaimer, the term of this patent is extended or adjusted under 35 U.S.C. 154(b) by 0 days.

(21) Appl. No.: 10/229,680

(22) Filed: Aug. 27, 2002

(65) Prior Publication Data

US 2004/0040902 A1    Mar. 4, 2004

(51) Int. Cl.[7] .............................................. B01D 36/02
(52) U.S. Cl. ..................... 210/108; 210/138; 210/169; 210/332; 210/333.01; 210/411; 210/195.1
(58) Field of Search ................................ 210/169, 106, 210/108, 409, 411, 422, 299, 310, 312, 425, 210/332, 333.01, 335, 791, 793, 138, 275, 210/277, 278, 426, 427, 259, 195.1

(56) References Cited

U.S. PATENT DOCUMENTS

| | | | | |
|---|---|---|---|---|
| 3,581,895 A | * | 6/1971 | Howard et al. | 210/108 |
| 3,616,915 A | * | 11/1971 | Whitlock | 210/108 |
| 3,670,893 A | * | 6/1972 | Seid | 210/138 |
| 3,868,319 A | * | 2/1975 | Black et al. | 210/691 |
| 4,207,181 A | * | 6/1980 | Drori | 210/111 |
| 4,349,434 A | | 9/1982 | Jaworski | 210/94 |
| 4,640,784 A | * | 2/1987 | Cant | 210/776 |
| 4,817,214 A | * | 4/1989 | Stuessy | 4/222 |
| 5,089,127 A | * | 2/1992 | Junker et al. | 210/206 |
| 5,641,399 A | * | 6/1997 | Rawlins | 210/169 |
| 5,980,761 A | * | 11/1999 | Boissie et al. | 210/807 |
| 6,156,213 A | | 12/2000 | Dudley et al. | 210/791 |
| 6,318,563 B1 | | 11/2001 | Drori | 210/411 |
| 6,592,752 B2 | * | 7/2003 | Mathews | 210/97 |
| 2001/0008218 A1 | * | 7/2001 | Chau | 210/278 |

* cited by examiner

Primary Examiner—Terry K. Cecil
(74) Attorney, Agent, or Firm—Schwegman, Lundberg, Woessner & Kluth, P.A.

(57) ABSTRACT

A self-cleaning water filtration system includes a pre-filter to filter oils and relatively medium sized particles in a water flow, a multi-stage filter to purify and provide a second level of filtration to the water flow, and a self-cleaning filter to provide a third level of filtration to the water flow. Water flow through the filter media of the self-cleaning filter is redirected to flush waste to a containment-tank filter. The self-cleaning filter has a purge output, which may spray the pre-filter to substantially remove particles from the pre-filter for collection in the containment tank. The multi-stage filter may have at least two layers of filter media. The pre-filter may be disposable and comprised of a mineral sanitizer positioned between two layers of an oil absorbing fabric.

22 Claims, 7 Drawing Sheets

SELF-CLEANING WATER FILTRATION SYSTEM AND METHOD

TECHNICAL FIELD

The present invention pertains to water filtration systems.

BACKGROUND

A conventional water filtration system (e.g., for a hot tub, spa, pool, pond or other body of water) may utilize a pump to pump the water through the filtration system, and a heater to heat the water to a desired temperature. The pump may also eject water through hydrotherapy jets and transfer water through the heater. Some systems incorporate two or more pumps to provide separate jet action from filtering and/or heating operations. The filtration systems of conventional hot tubs and spas generally apply a single-level of filtering. A single filter usually filters water pumped by each pump. These conventional filtrations systems may use one of several types of filters, the most common being sand filters, diatomaceous earth (DE) filters and removable cartridge-type filters for filtering the water. One problem with conventional filtration systems, especially conventional filtrations systems used in spas and hot tubs, is that the filters must be either cleaned or replaced on a regular basis. These filters are difficult to remove, difficult to clean, and expensive to replace. Accordingly, spa owners and operators are reluctant to perform this maintenance.

Another problem with conventional filtrations systems, especially conventional filtrations systems used in spas and hot tubs, is that they may not adequately remove particles and impurities in the water, especially when the filter has not been cleaned or replaced in a while. This may result in unsatisfactory and unsanitary conditions for the user, and may also result in degradation of system components.

Thus there is a general need for an improved water filtration system and method. There is also a need for an improved water filtration system particularly suitable for use with spas and hot tubs. There is also a general need a water filtration system and method that requires less maintenance. There is also a general need a water filtration system and method that is less expensive to operate and maintain. There is also a general need for a spa or hot tub with an improved water filtration system.

SUMMARY OF THE INVENTION

In several embodiments, the present invention provides a self-cleaning water filtration system and method. Embodiments of the present invention may be suitable for almost any body of water including spas, hot tubs, pools and ponds. In embodiments, the present invention also provides a self-cleaning water filtration system and method particularly suitable for spas and hot tubs. In accordance with one embodiment, a self-cleaning filtration system for a hot tub or spa includes a pre-filter to filter oils and relatively medium sized particles in a water flow, a multi-stage filter to at least partially purify and provide a second level of filtration to the water flow, and a self-cleaning filter to provide a third level of filtration to the water flow. Water flow through the filter media of the self-cleaning filter may be redirected to flush waste to a containment tank. The self-cleaning filter has a purge output, which may spray the pre-filter to substantially remove particles from the pre-filter for collection in the containment tank. The multi-stage filter may have at least two layers of filter media. The layers may include a mechanical layer to remove particles and a biological layer to at least partially purify the water flow. The layers of the multi-stage filter may also include a mineral layer to further provide some purification the water. In one embodiment, the pre-filter may be disposable and comprised of an optional mineral sanitizer positioned between two layers of an oil absorbing fabric. The water flow through the filter media of the self-cleaning filter may be redirected in response to an occurrence of either a change in output water pressure or an indication from a timer occurring on a regular basis.

In accordance with other embodiments, a method of filtering water in a hot tub or spa is provided. The method may include filtering water through a pre-filter to substantially remove oils and relatively medium sized particles in the water flow. The method may also include filtering water of the water flow with a multi-stage filter comprised of a plurality of layers of filter media to at least partially purify and filter the water flow. The method may also include filtering water of the water flow with a self-cleaning filter to provide a third level of filtration, and redirecting the water flow through the self-cleaning filter to flush waste from the self-cleaning filter and to flush the particles from the pre-filter. The redirecting may be performed in response to an occurrence of either a change in output water pressure of the self-cleaning filter or an indication from a timer that occurs on a regular basis. The method may also include spraying the pre-filter to substantially remove the particles from a surface of the pre-filter for collection in a containment tank. A purge output of the self-cleaning filter may spray the waste from the pre-filter into the containment tank when the water flow through the self-cleaning filter is redirected.

In accordance with another embodiment, a hot tub or spa is provided. The hot tub or spa includes a vessel to hold water and a self-cleaning water filtration and purification system. In accordance with embodiments, the use of self-cleaning filters may provide for 100% filtration of water, even when a by-pass element is operating.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

The present invention provides, in at least one embodiment, an improved water filtration system and method. Embodiments of the present invention also provide a water filtration system and method suitable for use with spas, hot tubs, swimming pools and ponds. Embodiments of the present invention also provide a water filtration system and method that requires less maintenance. Embodiments of the present invention also provide a water filtration system and method that may be less expensive to operate and maintain. Embodiments of the present invention also provide a spa or hot tub with an improved water filtration system. In at least one embodiment, maintenance may be significantly reduced because waste from the media of the self-cleaning filter may be automatically removed by flushing into a containment tank. Maintenance may be further reduced because during the flushing of the self-cleaning filter, particles on the pre-filter may be removed. Waste flushed from the filter media of the pre-filter into the containment tank is easily removed and the pre-filter filter media is relatively inexpensive to replace. In some embodiments, 100% filtration of water is provided.

Figure 1:
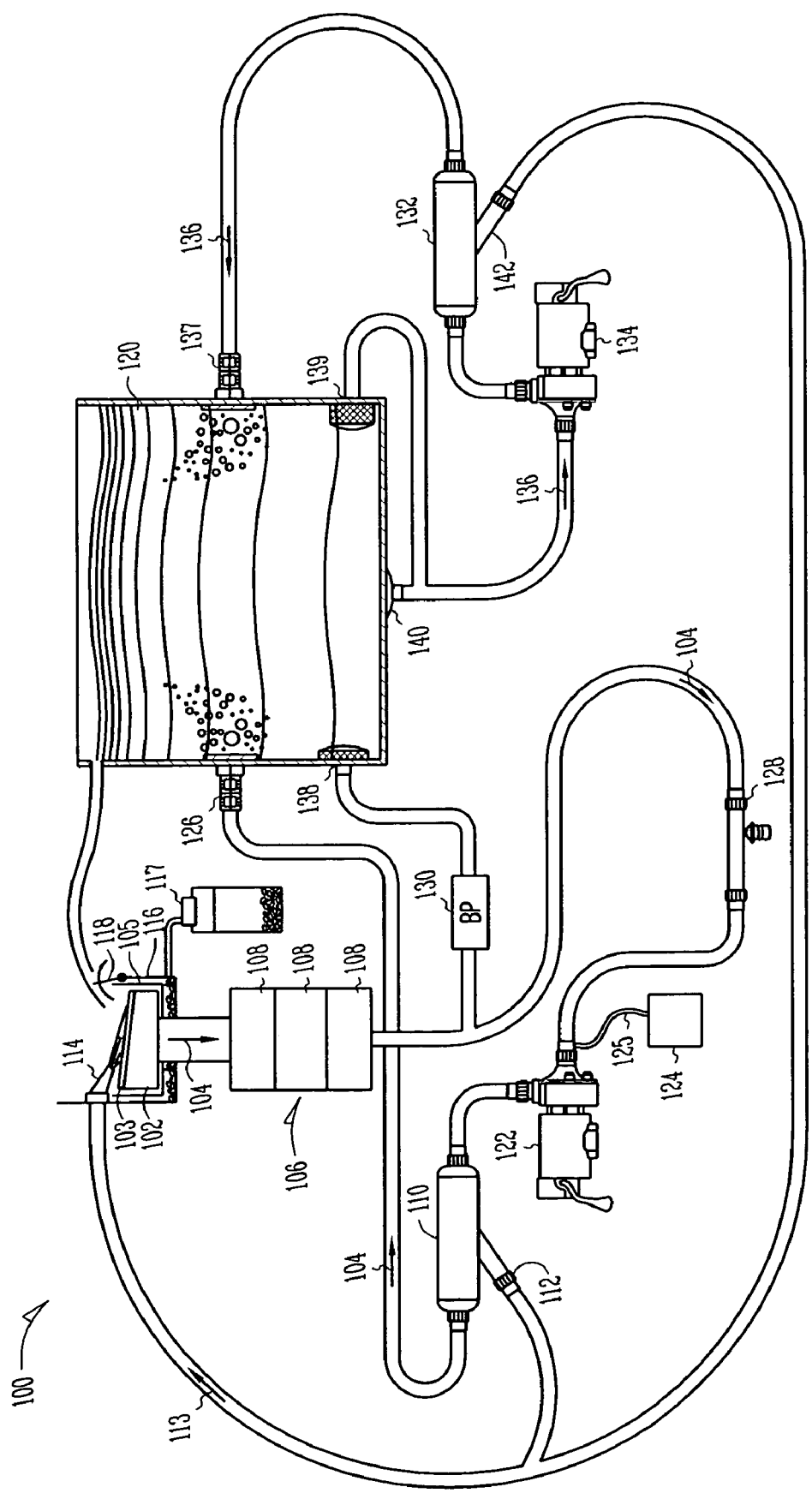
FIG. 1 is a functional diagram illustrating a self-cleaning filtration system in accordance with an embodiment of the present invention.
Figure 7:
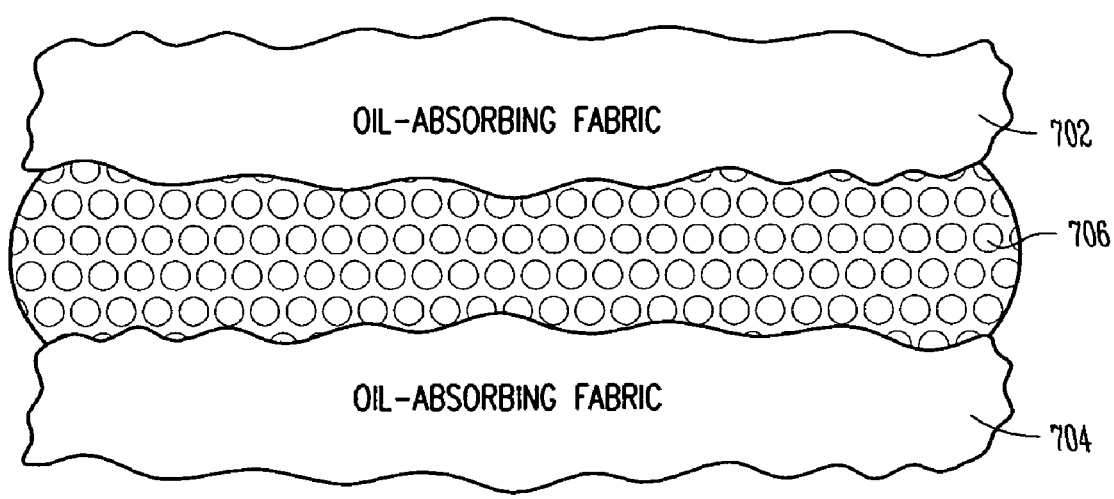
FIG. 7 depicts the first level filter media including an optional mineral sanitizer positioned between two layers of an oil absorbing fabric.

FIG. 1 is a functional diagram illustrating a self-cleaning filtration system in accordance with an embodiment of the present invention. Filtration system 100 provides for water filtration and/or water purification utilizing a multi-step filtration process. System 100 may be suitable for filtering and/or purifying any body of water including, for example, spas, hot tubs, swimming pools, ponds, and the like. In one embodiment, system 100 includes pre-filter 102 to provide a first level of filtration and/or sanitation to filter oils and relatively medium sized particles in water flow 104. Pre-filter 102 may comprise first-level filter media 103 that may be disposable and may be comprised of an oil absorbing fabric. In one embodiment, illustrated in FIG. 7, first level filter media 103 may include an optional mineral sanitizer 706 (FIG. 7) positioned between two layers (702 & 704 (FIG. 7)) of an oil absorbing fabric. The mineral sanitizer may be optional and may be used as an alternative to a chlorine or bromine sanitizer. Pre-filter 102 and/or media 103 may be removable for cleaning and/or replacement. First level filter media 103 may be comprised of an oil-absorbing felt or felt-like material. First level filter media 103 may also absorb other impurities such as soaps and lotions present in water flow 104.

System 100 may also include multi-stage filter 106 to provide a second level of filtration to water flow 104. Multi-stage filter 106 may be comprised of a plurality of layers 108 of media. In one embodiment, multi-stage filter 106 includes at least two layers of filter media, and each layer 108 may be comprised of different filtering media, although this is not a requirement. The layers may include a mechanical layer to remove particles, and a biological layer to at least partially purify the water flow. One embodiment may include a third layer, which may be a mineral layer to further provide purification of the water. Filter 106 may be located by an outside panel of the spa for easy access and removability.

System 100 may also include self-cleaning filter 110 to provide a third level of filtration to water flow 104. Water filtered by self-cleaning filter 110 may be directed to jets 126. In accordance with embodiments of the present invention, the water flow through the filter media of self-cleaning filter 110 may be redirected or reversed to flush waste from the filter media of self-cleaning filter 110. In one embodiment, the water flow through the filter media of self-cleaning filter 110 may be redirected in response to an occurrence of either a change in output water pressure of the self-cleaning filter, or an indication from a timer that may occur on a regular basis. In another embodiment, the water flow through the filter media of self-cleaning filter 110 may be redirected in response to a pressure differential between an input and an output of the self-cleaning filter. In another embodiment, the water flow through the filter media of self-cleaning filter 110 may be redirected in response an output pressure of the self-cleaning filter dropping below a predetermined level. In yet another embodiment, the water flow through the filter media of self-cleaning filter 110 may be redirected on a regular basis in response to a timer. This self-cleaning process may be performed automatically (e.g., without user input). In one embodiment, self-cleaning filter 110 may include one or more valves actuated by a controller to reverse the water flow through self-cleaning filter 110. The controller may be responsive to either a timer or one or more pressure inputs.

Self-cleaning filter 110 may have purge output 112, which may direct wastewater 113 to nozzle 114 which may spray media 103 of pre-filter 102 to substantially remove the particles from pre-filter 102 when the water flow through the filter media of self-cleaning filter 110 is redirected. The waste may be collected in containment tank 116. In one embodiment, media 103 of pre-filter 102 may be angled to allow for easier removal of waste and debris and collection by containment tank 116. Containment tank 116 may collects debris and filter waste during the reversal of water flow through the filter media of self-cleaning filter 110. Containment tank 116 may act as a settlement tank allowing particles to settle in a reservoir of tank 116. In one embodiment, containment tank 116 may include a removable filter and/or basket 105, which may be comprised of a mesh to allow for easy removal of the waste flushed form media 103 from the reservoir. In another embodiment, containment tank 116 may be coupled with containment filtering element or separate tank 117 to separate the flushed waste from containment tank 116.

System 100 may also include pump 122 to generate water flow 104. In one embodiment, pump 122 may be positioned between multi-stage filter 106 and self-cleaning filter 110 to generate water flow 104 by drawing water through pre-filter 102 and multi-stage filter 106, and by pumping water through self-cleaning filter 110. In alternate embodiments, pump 122 may be positioned in other locations to generate water flow 104.

System 100 may also include skimmer 118 to trap relatively large particles from a surface of water drawn from vessel 120 prior to filtering by pre-filter 102. The relatively large particles may include at least leaves, clothing and floating objects, for example. The relatively large particles may be pulled behind a floating and/or pivoting door that may lower to below the water line allowing water to spill over the door when pump 122 is generating water flow 104. When pump 122 is not generating water flow 104, the floating and/or pivoting door may return to the water line allowing the relatively large particles to remain trapped in the skimmer for subsequent removal.

System 100 may also include sanitizer 124 which may inject a sanitizing agent into water flow 104 through injector 125. Sanitizer 124 is an optional element of system 100. In one embodiment, sanitizer 124 injects the sanitizing agent into water flow 104 before pump 122 so that an impeller of the pump acts to help mix the sanitizing agent with the water. In an alternate embodiment, sanitizer 124 injects a sanitizing agent into water flow 104 at another location. Sanitizing agents that may be injected by sanitizer 124 include, for example, ozone and may include an ozone generator. In other embodiment, sanitizer 124 may inject other sanitizing agents such as bromine and chlorine, or even an algaecide. In an embodiment of the present invention, water that includes injected sanitizing agents is directed through one or more jets 126 into vessel 120. For ease of understanding, only one of jets 126 is illustrated. Conventional spas and hot tubs, on the other hand, typically direct water with an injected sanitizing agent through a single separate inlet. The use of one or more of jets 126 providing water with injected sanitizing agents improves mixing of the sanitizing agent with water in vessel 120 which may improve water purification. In one embodiment of the present invention, a mixing chamber (not illustrated) may be used to mix the sanitizing agent with water flow 104.

System 100 may also include heater 128 to heat the water of water flow 104. In one embodiment, heater 128 may be positioned in water flow 104 before pump 122 although in other embodiments, heater 128 may operate in other locations. For example, heater 128 may be positioned in water flow 104 after self-cleaning filter 110 before jets 126.

System 100 may also include by-pass (BP) element 130 which may operate as an emergency by-pass to provide an alternate/back-up route for water flow in case the water flow through skimmer 118, pre-filter 102, or multi-stage filter 106 is significantly reduced due to a clog, for example. By-pass element 130 may include a one-way spring operated check-valve. In an alternate embodiment, the function of by-pass element 130 may be accomplished through other plumbing configurations. By-pass element 130 allows water to be drawn through by-pass suction inlet 138 when operating in a by-pass mode.

In accordance with embodiments of the present invention, each filtering stage (e.g., pre-filter 102, multi-stage filter 106 and self-cleaning filter 110) may remove increasing smaller particles and/or additional impurities in water flow 104. For example, in one embodiment, pre-filter 102 may remove particles and other waste approximately greater than fifteen to twenty microns in size, while multi-stage filter 106 may remove particles between approximately five and twenty microns in size or smaller. Filter 110 may, for example, remove particles of approximately less than five microns in size, although this is not a requirement. Filter 110 may alternatively remove particles, for example between approximately two-hundred and four-hundred microns in size, for example, and therefore provide filtration primarily when by-pass 130 element is operating to by-pass filters 102 and 106.

In one embodiment, system 100 may be a two-pump or multiple-pump filtration system. In this embodiment, system 100 may include second self-cleaning filter 132 and second pump 134 to generate second water flow 136. Water of second water flow 136 may be drawn through suction inlet 139 and/or bottom drain 140 of vessel 120. Pump 134 may pump water through second self-cleaning filter 132 and may provide filtered water through jets 137. In accordance with this embodiment, containment tank 116 may receive waste from purge output 142 of second self-cleaning filter 132 for removal when the water flow through the filter media of second self-cleaning filter 132 is redirected. Second self-cleaning filter 132 may operate similar to self-cleaning filter 110, and in one embodiment, the purge output of either self-cleaning filter 110 or 132 may direct wastewater to nozzle 114 to spray pre-filter 102 and substantially remove particles for collection in containment tank 116. This may occur when the respective water flow through either the first or second self-cleaning filter is redirected. In one embodiment, an optional second sanitizer injector may inject a sanitizing agent from a sanitizer, such as sanitizer 124 into water flow 136 before pump 134. Filter 132 may remove particles, for example, ranging between approximately two hundred and four hundred microns in size, although other ranges are also suitable. In accordance with embodiment, the use of self-cleaning filters 110 and 132 may provide for 100% filtration of water even during the operation of by-pass element 130. In other words, any water circulated or pumped is filtered.

In yet another embodiment, system 100 may be a multiple-pump filtration system having three or more pumps and/or self-cleaning filters. In this embodiment, the third and any addition pumps may be configured similar to second self-cleaning filter 132 and second pump 134 to generate a third water flow there through.

Although system 100 is illustrated as having several separate functional elements, one or more of the functional elements may be combined and may be implemented by various combinations of physical elements to achieve the desired functionality. Accordingly, embodiments of the present invention are not limited to the functional configuration illustrated in FIG. 1.

Figure 2:
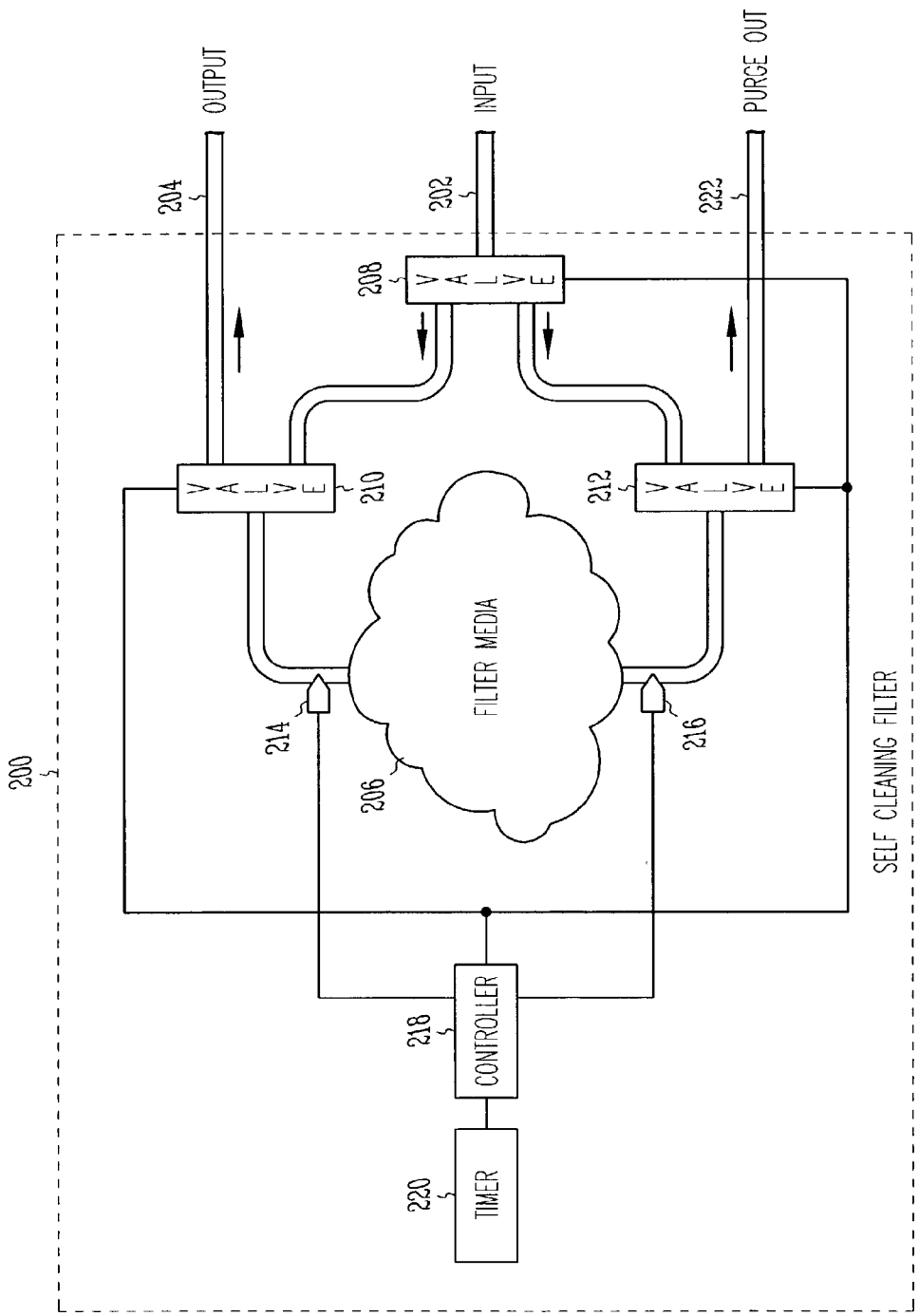
FIG. 2 is a functional diagram of a self-cleaning filter in accordance with an embodiment of the present invention.

FIG. 2 is a functional diagram of a self-cleaning filter in accordance with an embodiment of the present invention. Self-cleaning filter 200 is suitable for use as self-cleaning filter 110 (FIG. 1) and self-cleaning filter 132 (FIG. 1) although other self-cleaning filters and self-cleaning filter configurations may also be suitable. In general, water to be filtered by filter 200 is received at input 202, is filtered by filter media 206, and is provided at output 204. Filter media 206 may be almost any media suitable for filtering particles of predetermined sizes. For example, in one embodiment, filter media may remove particles, for example, ranging between approximately two hundred and four hundred microns in size, although other ranges are also suitable. In another embodiment, filter media may remove particles, for example, ranging less than five microns in size. Filter media 206 may, for example, be comprised of sand, diatomaceous earth (DE), and/or paper. In one embodiment, filter media 206 may be a cartridge-type filter that utilizes a paper filter media. In accordance with embodiments of the present invention, the water flow through media 206 of self-cleaning filter 200 may be redirected or reversed to flush waste from the filter media. The wastewater is provided at purge output 222.

In one embodiment, the water flow through media 206 may be automatically redirected when waste builds up in media 206 resulting in an increased pressure drop across media 206. In this embodiment, one or more pressure sensors 214, 216 may provide input to controller 218 to sense pressure changes or pressure differentials. Controller 218 may actuate one or more valves 208, 210 and 212 to reverse water flow through filter media 206 when, for example, an input pressure sensed by input pressure sensor 216 exceeds a predetermined level, an output pressure sensed by output pressure sensor 214 drops below a predetermined level, and/or a pressure differential between the pressure sensors exceeds a predetermined level.

In another embodiment, timer 220 may provide a signal to controller 218 on a regular basis causing controller 218 to actuate one or more valves 208, 210 and 212 to reverse water flow through filter media 206. In this embodiment, controller 218 may provide a signal to a system controller of a filtration system, such as system 100 (FIG. 1) to start the operation of pump 122 to assure that a water flow through filter 200 is generated when the valves are actuated. Timer 220 may retain a current time-of-day.

In one embodiment, controller 218 and timer 220 may be physically separate from filter 200 and may be functionally part of a system controller of a filtration system, such as system 100 (FIG. 1). In this embodiment, controller 218 and timer 220 may be used to control valves in multi-pump systems and systems having more than one self-cleaning filter. Although filter 200 is illustrated as having several separate functional elements, one or more of the functional elements may be combined and may be implemented by various combinations of physical elements to achieve the desired functionality. Accordingly, embodiments of the present invention are not limited to the functional configuration illustrated in FIG. 2.

Figure 3:
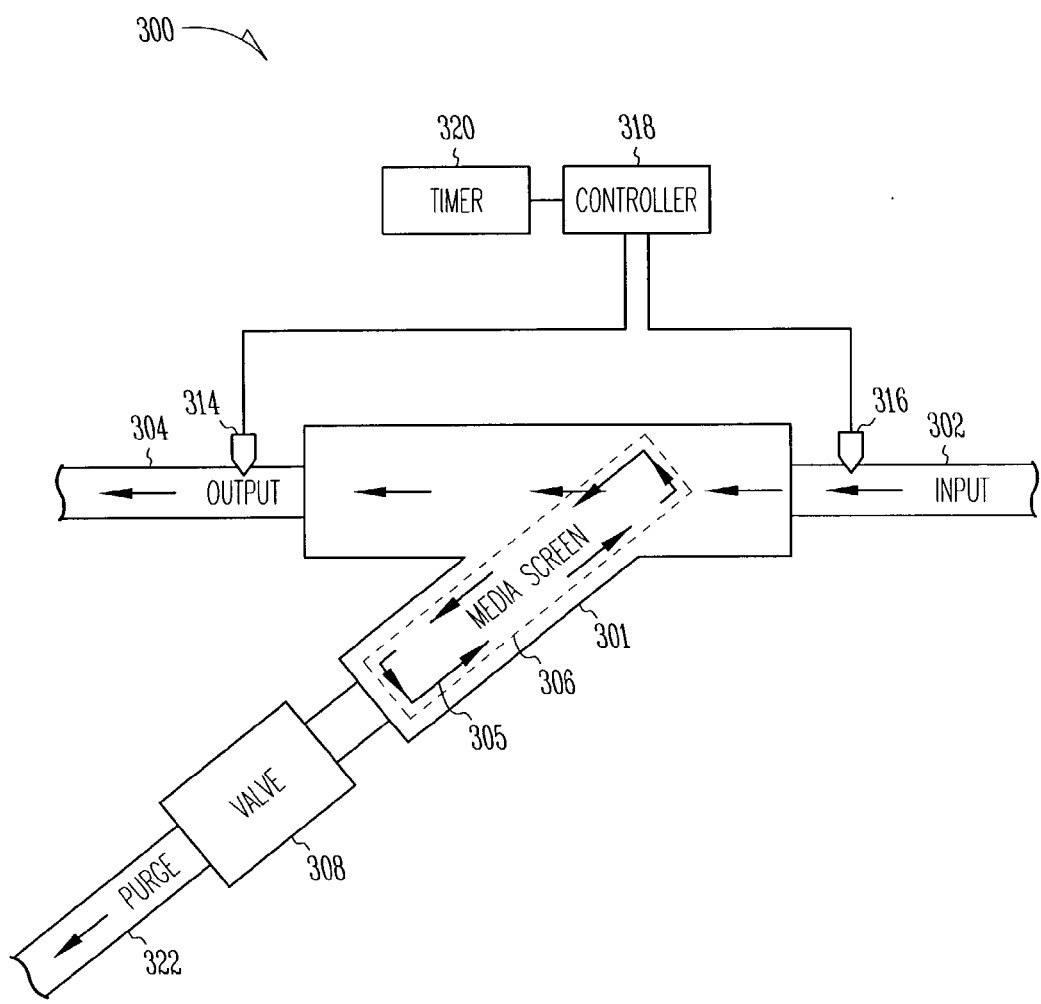
FIG. 3 is a functional diagram of a self-cleaning filter in accordance with another embodiment of the present invention.

FIG. 3 is a functional diagram of a self-cleaning filter in accordance with another embodiment of the present invention. Self-cleaning filter 300 is suitable for use as self-cleaning filter 110 (FIG. 1) and self-cleaning filter 132 (FIG. 1) although other self-cleaning filters and self-cleaning filter configurations may also be suitable. In general, water to be filtered by filter 300 is received at input 302, is filtered by filter media 306, and is provided at output 304. In one embodiment, water may flow through media 306 as illustrated by arrows 305. Filter media 306 may be almost any media suitable for filtering particles of predetermined sizes. For example, in one embodiment, filter media may remove particles, for example, ranging between approximately two hundred and four hundred microns in size, although other ranges are also suitable. In another embodiment, filter media may remove particles, for example, ranging less than five microns in size.

In one embodiment, the water flow through media 306 may be automatically redirected when waste builds up in media 306 resulting in an increased pressure drop across media 306. In this embodiment, one or more pressure sensors 314, 316 may provide input to controller 318 to sense pressure changes or pressure differentials. Controller 318 may actuate one or more valves 308 to reverse water flow through filter media 306 when, for example, an input pressure sensed by input pressure sensor 316 exceeds a predetermined level, an output pressure sensed by output pressure sensor 314 drops below a predetermined level, and/or a pressure differential between the pressure sensors exceeds a predetermined level.

In another embodiment, timer 320 may provide a signal to controller 318 on a regular basis causing controller 318 to actuate one or more valves 308 flush water through filter media 306 through purge output 322. In this embodiment, controller 318 may provide a signal to a system controller of a filtration system, such as system 100 (FIG. 1) to start the operation of pump 122 to assure that a water flow through filter 300 is generated when the valves are actuated. Timer 320 may retain a current time-of-day.

In one embodiment, filter media 305 may be comprised of a filter screen, such as sediment strainer, to trap solid impurities. The filter screen may be a selectable mesh to provide selectable levels of filtration. In this embodiment, the filter screen may be replaceable. In one embodiment, filter screen may be selected to provide filtration for particles ranging from two hundred microns of less, to as large as particles of 690 microns or even greater. Filter 300 may include housing 301, which may be comprised of a PVC.

Figure 4:
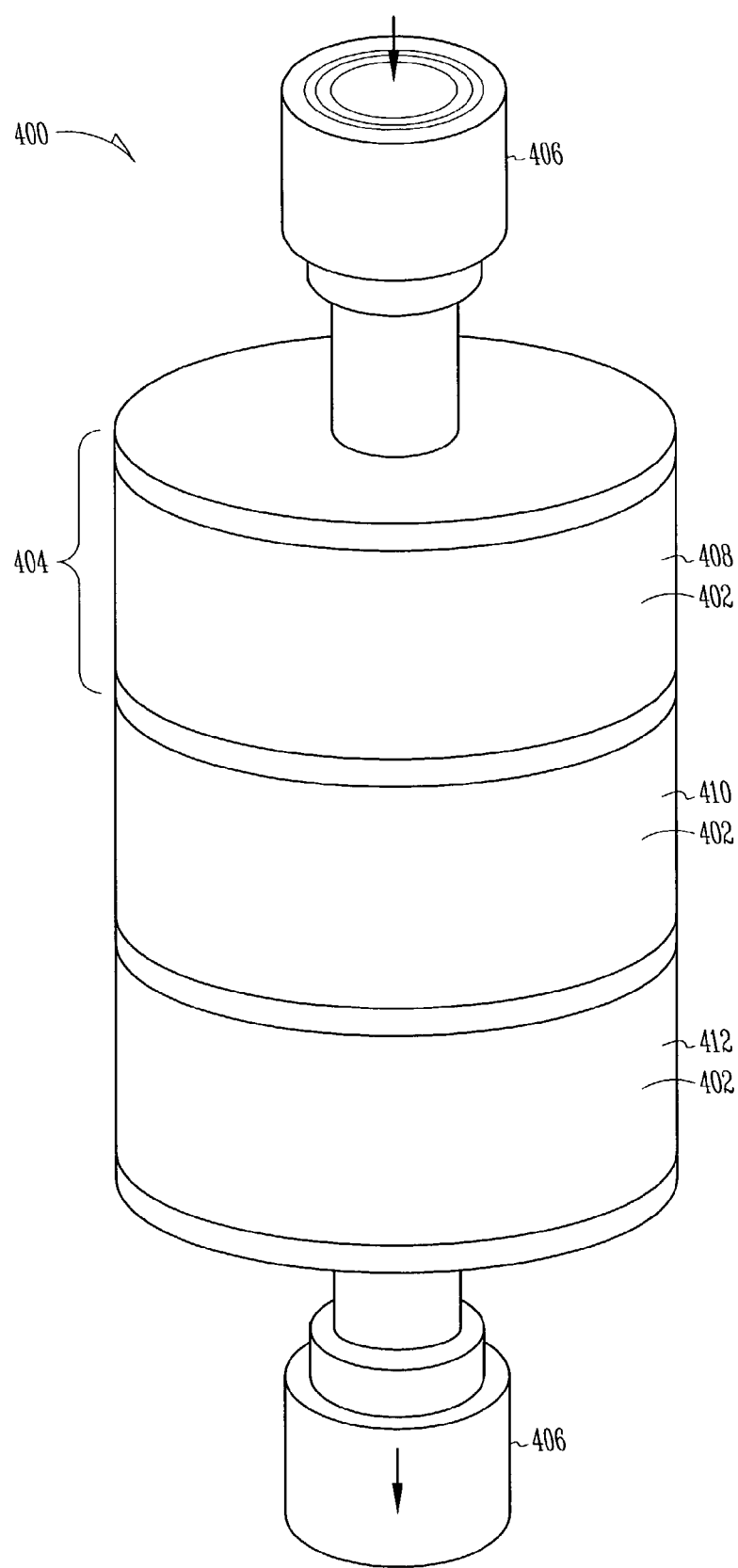
FIG. 4 is a functional diagram of a multi-stage filter in accordance with an embodiment of the present invention.

FIG. 4 is a functional diagram of a multi-stage filter in accordance with an embodiment of the present invention. Multi-stage filter 400 may be used to filter a water flow and may be comprised of a plurality of layers 402 of filter media. Multi-stage filter 400 is suitable for use as multi-stage filter 106 (FIG. 1) although other filters may also be suitable. In one embodiment, layers 402 may include one or more of a mechanical layer, a biological layer and a chemical layer. The mechanical layer may remove particles and the biological layer may at least partially purify the water flow. The mineral layer may further provide at least some purification of the water. Layers 402 may be comprised of charcoal, sand, paper, zeolite, sponge, carbon, rock, stone, cloth, mineral and/or fiber.

In embodiments of the present invention, first layer 408 may substantially remove relatively small sized particles, (e.g., particles between ten and twenty microns) and may be comprised of a sponge, paper, fiber or other filtering media. Second layer 410 may provide purification and may be comprised of charcoal or a carbon material. Third layer 412 may provide further purification and may include Zeolite or other mineral. In one embodiment, third layer 412 may, for example, be comprised of rock, stone or other element, chemically treated with a chemical or mineral such as Zeolite, which may slowly dissolve from the rock or stone. Third layer 412 may alternatively be comprised of sodium carbonate, zinc and/or silvercoated/treated particles, or a mixture thereof, allowing such material to be dissolved into the water flow. In the case of silver-coated particles, for example, silver ions released in the water help provide purification.

In one embodiment, layers 402 may reside in interlocking units 404 and may be separably removable and replaceable. For example, an owner or operator of the spa may be able to replace one or more layers 402 of the media without having to replace entire filter 400. In one embodiment, the media of one or more of layers 402 may be viewable through a see-through plastic or glass to allow a user to determine when to replace the one or more layers 402. In an alternate embodiment, filter 400 is entirely replaceable and may be configured in a canister-type arrangement. In this embodiment, filter 400 may, for example, have quick-disconnects 406 at an input and output to allow for easy removability. Other means of coupling filter 400 in-line are also suitable.

Figure 5:
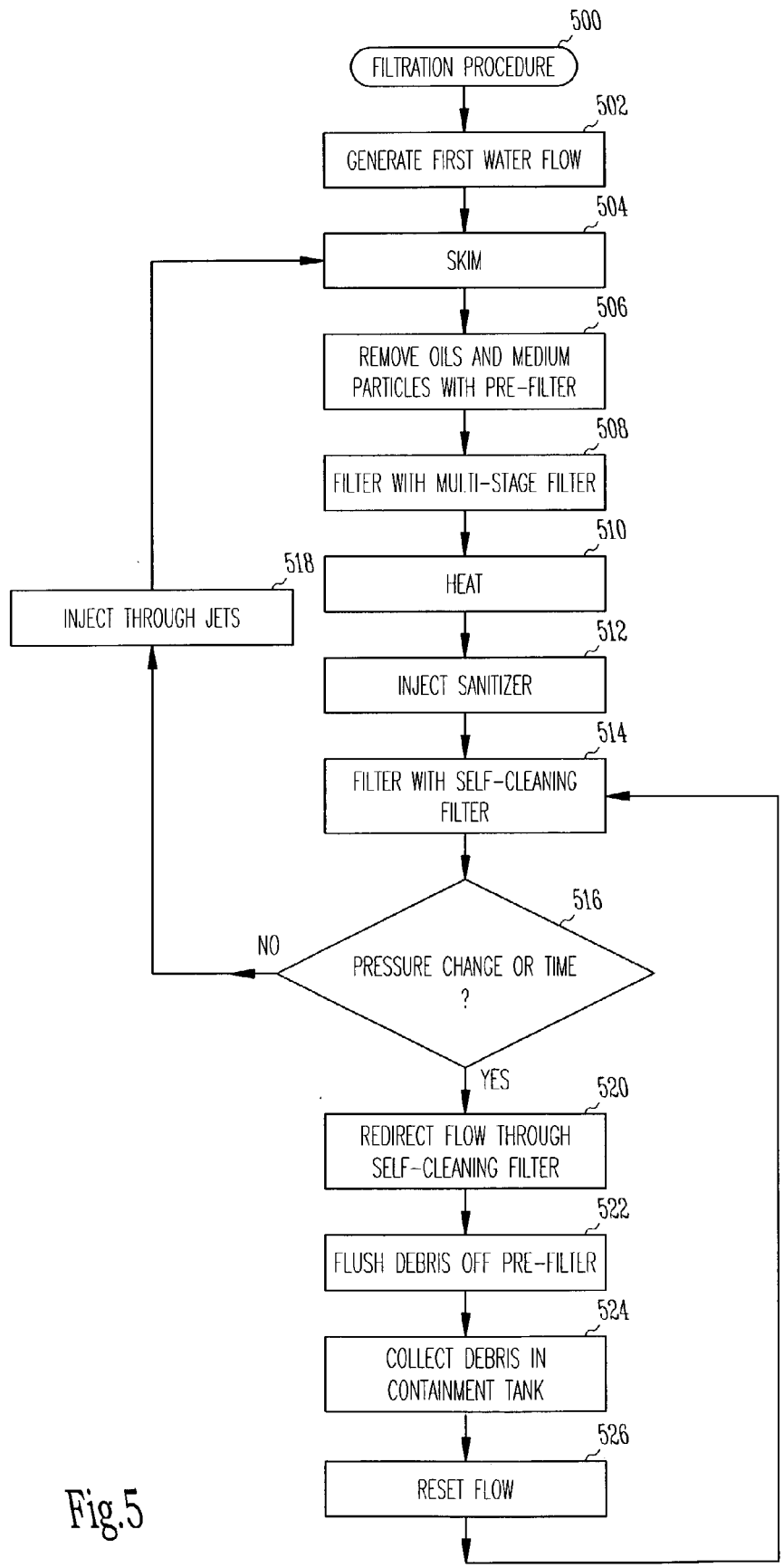
FIG. 5 is a flow chart of a water filtration procedure in accordance with an embodiment of the present invention.

FIG. 5 is a flow chart of a water filtration procedure in accordance with an embodiment of the present invention. Water filtration procedure 500 may be used to filter and/or sanitize any body of water, and in several embodiments, may be used to filter water of spa or hot tub. Water filtration procedure 500 may be performed by various elements of a filtrations system, such as filtration system 100 (FIG. 1) although other systems may also be suitable for performing procedure 500. Although the individual operations of procedure 500 are illustrated and described as separate operations, one or more of the individual operations may be performed concurrently and nothing requires that the operations be performed in the order illustrated.

In operation 502, a pump, for example, generates a water flow. In operation 504, a skimming operation may be performed wherein water from a surface of a spa or hot tub is drawn through a skimmer to trap relatively large particles. In operation 506, oils and medium sized particles may be removed, for example, with a pre-filter. The pre-filter media may be disposable, may be comprised of an oil-absorbing fabric and may also have a mineral sanitizer disposed between layers of oil-absorbing fabric.

In operation 508, the water flow is filtered and/or purified with a multi-stage filter, which may be similar to multistage filter 400 (FIG. 4) to remove relatively small particles and/or certain impurities in the water. In operation 510, the water flow may be heated and in operation 512, a sanitizer may be injected into the water flow. In operation 514, the water flow may be filtered with a self-cleaning filter, such as self-cleaning filter 200 (FIG. 2).

Operation 516 determines when to activate the self-cleaning operations of the self-cleaning filter and may use pressure measurements or may be responsive to a signal from a timer. When operation 516 determines to active the self-cleaning operations of the self-cleaning filter, operations 520 through 526 may be performed. When operation 516 determines not to active the self-cleaning operations of the self-cleaning filter, operation 518 is performed. Operation 516 may be performed by a controller, such as controller 218 (FIG. 2).

In operation 518, the filtered water from operation 514 may be injected through jets of the hot tub returning filtered and/or purified water to the vessel. Operations 504 through 516 may be repeated on a regular basis to filter and/or provide some purification of the water.

In operation 520, the water flow through the filter media of the self-cleaning filter is redirected. Operation 520 may flush waste from the media of the self-cleaning filter, and in operation 522, the wastewater may be used to remove particles and other waste from the pre-filter. In operation 524, the particles may be flushed to a containment tank, such as containment tank 116 (FIG. 1) and in one embodiment, the wastewater may be filtered in a containment-tank filter. Operations 520 through 524 may be performed for a predetermined length of time, which may be sufficient to allow waste to be flushed from the filter media of the self-cleaning filter and to allow particles and other debris to be removed from the pre-filter. After the predetermined length of time, operation 526 may reset the water flow through the filter media of the self-cleaning filter allowing the self-cleaning filter to provide filtered water for injection through jets in operation 518.

Figure 6:
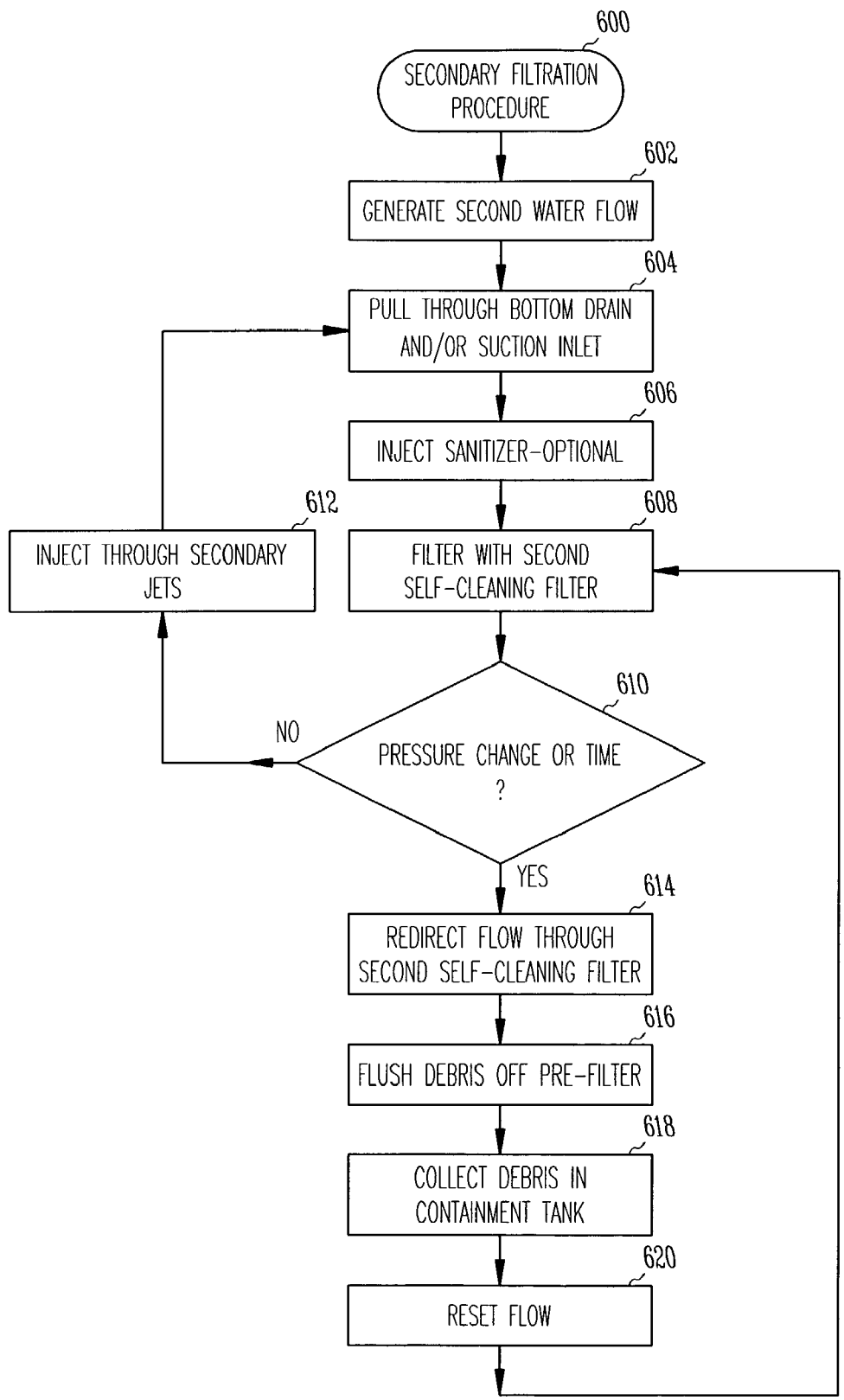
FIG. 6 is a flow chart of a secondary water filtration procedure in accordance with an embodiment of the present invention.

FIG. 6 is a flow chart of a secondary water filtration procedure in accordance with an embodiment of the present invention. Secondary water filtration procedure 600 may be performed by a secondary filtration and/or purification system for a body of water having a two-pump or multi-pump system. For example, second self-cleaning filter 132 (FIG. 1) and second pump 134 (FIG. 1) may perform at least portions of procedure 600. Procedure 600 may be performed concurrently with procedure 500 although nothing requires that in both self-cleaning filters operate in a self-cleaning mode concurrently. Although the individual operations of procedure 600 are illustrated and described as separate operations, one or more of the individual operations may be performed concurrently and nothing requires that the operations be performed in the order illustrated.

In operation 602, a second water flow is generated, for example, by the secondary pump. In operation 604, water is pulled through a bottom drain and/or suction inlet of the hot tub or spa. In operation 606, a sanitizer may optionally be injected into the second water flow. In operation 608, the second water flow may be filtered with a self-cleaning filter, such as self-cleaning filter 200 (FIG. 2). Operation 610 determines when to activate the self-cleaning operations of the self-cleaning filter and may use pressure measurements or may be responsive to a signal from a timer. When operation 610 determines to active the self-cleaning operations of the self-cleaning filter, operations 614 through 620 may be performed. When operation 610 determines not to active the self-cleaning operations of the self-cleaning filter, operation 612 is performed. Operation 610 may be performed by a controller, such as controller 218 (FIG. 2).

In operation 612, the filtered water from operation 608 may be injected through jets of the hot tub returning filtered and/or purified water to the vessel. Operations 604 through 612 may be repeated on a regular basis to filter and/or at least partially provide purification of the water.

In operation 614, the water flow through the filter media of the self-cleaning filter is redirected. Operation 614 may flush waste from the media of the self-cleaning filter, and in operation 616, the wastewater may be used to remove particles from the pre-filter. In operation 618, the particles may be flushed to a containment tank, such as containment tank 116 (FIG. 1) and the wastewater may be filtered in a containment-tank filter. Operations 614 through 618 may be performed for a predetermined length of time, which may be sufficient to allow waste to be flushed from the filter media of the self-cleaning filter and to allow particles to be removed from the pre-filter. After the predetermined length of time, operation 620 may reset the water flow through the filter media of the self-cleaning filter allowing the self-cleaning filter to provide filtered water for injection through jets in operation 612.

Thus, an improved water filtration system and method suitable has been adequately described. Embodiments of the present invention also described provide a water filtration system and method for spas, hot tubs, swimming pools, ponds and other bodies of water. The water filtration system and method of embodiment of the present invention may require less maintenance. Embodiments of the present invention also described provide a water filtration system and method that may be less expensive to operate and maintain. Embodiments of the present invention also described include a spa or hot tub with an improved water filtration system. In at least one embodiment, maintenance may be significantly reduced because waste from the media of the self-cleaning filter may be automatically removed by flushing into a containment tank. Maintenance may be further reduced because during the flushing of the filter media of the self-cleaning filter, particles on the pre-filter may be removed. Waste flushed from the filter media of the pre-filter into the containment tank is easily removed and the pre-filter filter media is relatively inexpensive to replace.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A self-cleaning filtration system comprising:
 a pre-filter to filter oils and particles in a water flow;
 a multi-stage filter;

a self-cleaning filter to further filter the water flow;
a containment tank to receive waste from a purge output of the self-cleaning filter when the water flow through the filter media of the self-cleaning filter is redirected; and
the purge output including a means to spray the pre-filter with redirected water to remove at least some of the particles from the pre-filter for collection in the containment tank, and wherein redirected water from the purge output is recirculated after filtering through the multistage filter.

2. The system of claim 1, wherein the purge output has a nozzle to spray the pre-filter with redirected water to remove at least some of the particles from the pre-filter for collection in the containment tank, and wherein the water flow through the filter media of the self-cleaning filter is redirected in response to an occurrence of either a change in output water pressure of the self-cleaning filter or an indication from a timer that occurs on a regular basis.

3. The system of claim 2 wherein the pre-filter provides a first level of filtration and the self cleaning filter provides a third level of filtration,
wherein the multi-stage filter is to at least partially purify and provide a second level of filtration to the water flow, the multi-stage filter comprising a plurality of layers of media, and
wherein the water flow is pulled through the multistage filter.

4. The system of claim 3 wherein the multi-stage filter includes at least two layers of filter media, each layer comprising either charcoal, sand, paper, zeolite, sponge, carbon, rock, stone, cloth, mineral or fiber.

5. The system of claim 4 wherein the at least two layers of filter media reside in interlocking units and are separably removable and replaceable, and
wherein the filter media of at least one of the layers is viewable through a see-through material.

6. The system of claim 5 wherein the at least two layers of filter media include a first layer to substantially remove relatively small sized particles, and a second layer to at least partially purify the water flow, and
wherein the relatively small sized particles comprise particles ranging in size between approximately five and twenty microns.

7. The system of claim 4 further comprising a pump positioned between the multi-stage filter and the self-cleaning filter to generate the water flow by drawing water through the pre-filter and the multi-stage filter and to pump water through the self-cleaning filter.

8. The system of claim 2 wherein the pre-filter includes a first-level media that is disposable and comprises an oil absorbing fabric, and
wherein the purge output is to spray a surface of the pre-filter with the redirected water to remove at least some of the particles from the pre-filter for collection in the containment tank.

9. The system of claim 8 wherein the pre-filter further comprises a mineral sanitizer positioned between two layers of the oil absorbing fabric.

10. The system of claim 2 further comprising a skimmer to trap debris from a surface of water prior to filtering by the pre-filter.

11. The system of claim 1 further comprising a sanitizer injector positioned in the water flow before a pump to inject a sanitizing agent into the water, wherein an impeller of the pump acts to mix the sanitizing agent in the water.

12. The system of claim 1 wherein the self-cleaning filter has an output to direct the water flow to jets when the water flow through the filter media of the self-cleaning filter is not redirected.

13. The system of claim 1 wherein the self-cleaning filter includes one or more valves actuated by a controller to reverse the water flow through the self-cleaning filter, the controller responsive to either a time or a pressure input.

14. The system of claim 1 wherein the self-cleaning filter is a first self cleaning filter and wherein the system further comprises:
a first pump positioned between the multi-stage filter and the self-cleaning filter to generate a first water flow by drawing water through the pre-filter and the multi-stage filter and to pump water through the first self-cleaning filter.

15. The system of claim 14 further comprising:
a second self-cleaning filter having a purge output to provide waste to the containment tank when water through the second self-cleaning filter is redirected; and
a second pump to generate a second water flow by drawing water through a suction inlet and to pump water through the second self-cleaning filter.

16. The system of claim 15 wherein the containment tank is to receive waste from purge outputs of the first and second self-cleaning filters for removal when the respective water flow through either the first or second self-cleaning filter is redirected.

17. A self-cleaning filtration system comprising:
a pre-filter to provide a first level of filtration to filter oils and particles in a water flow;
a multi-stage filter to at least partially purify and provide a second level of filtration to the water flow, the multi-stage filter comprising a plurality of layers of media;
a self-cleaning filter to provide a third level of filtration to the water flow, wherein the water flow through filter media of the self-cleaning filter is redirected to flush waste from the self cleaning filter;
a containment tank to receive the waste from a purge output of the self-cleaning filter when the water flow through the filter media of the self-cleaning filter is redirected,
wherein the water flow through the filter media of the self-cleaning filter is redirected in response to an occurrence of either a change in output water pressure of the self-cleaning filter or an indication from a timer that occurs on a regular basis, and
wherein the purge output has a nozzle to spray a first-level media of the pre-filter to substantially remove the particles from the pre-filter for collection in the containment tank when the water flow through the filter media of the self-cleaning filter is redirected.

18. The system of claim 17 wherein the containment tank includes a removable basket.

19. A self-cleaning filtration system comprising:
a pre-filter to provide a first level of filtration to filter oils and particles in a water flow;
a multi-stage filter to at least partially purify and provide a second level of filtration to the water flow, the multi-stage filter comprising a plurality of layers of media;
a first self-cleaning filter to provide a third level of filtration to the water flow, wherein the water flow through filter media of the first self-cleaning filter is redirected to flush waste from the self cleaning filter;

a first pump positioned between the multi-stage filter and the self-cleaning filter to generate a first water flow by drawing water through the pre-filter and the multi-stage filter and to pump water through the first self-cleaning filter;

a second self-cleaning filter;

a second pump to generate a second water flow by drawing water through a suction inlet and to pump water through the second self-cleaning filter; and a containment tank to receive waste from purge outputs of the first and second self-cleaning filters for removal when the respective water flow through either the first or second self-cleaning filter is redirected, wherein the purge outputs direct water through a nozzle to spray a first-level media of the pre-filter to remove the particles that reside on the pre-filter for collection in the containment tank when the respective water flow through either the first or second self-cleaning filter is redirected.

20. The system of claim 1 wherein the water flow through the filter media of the self-cleaning filter is redirected in response to a pressure differential between an input and an output of the self-cleaning filter.

21. The system of claim 1 wherein the water flow through the filter media of the self-cleaning filter is redirected in response to an output pressure of the self-cleaning filter dropping below a predetermined level.

22. A filtration system comprising:

a pre-filter to provide a first level of filtration to filter oils and relatively medium sized particles in a water flow;

a multi-stage filter; to at least partially purify and provide a second level of filtration to the water flow, the multi-stage filter comprised of a plurality of layers of media; and a self-cleaning filter to provide a third level of filtration to further filter the water flow, wherein the water flow through filter media of the self-cleaning filter is redirected to flush waste from the self cleaning filter, and wherein a purge output of the self-cleaning filter is configured to spray the pre-filter with redirected water to remove at least some of the particles from the pre-filter, and wherein the redirected water from the purge output is recirculated after filtering through the multistage filter.

* * * * *

UNITED STATES PATENT AND TRADEMARK OFFICE
CERTIFICATE OF CORRECTION

PATENT NO. : 6,958,118 B2
DATED : October 25, 2005
INVENTOR(S) : Hill et al.

It is certified that error appears in the above-identified patent and that said Letters Patent is hereby corrected as shown below:

Title page,
Item [73], Assignee, "Montreal" insert -- , Quebec --.

Signed and Sealed this

Seventeenth Day of January, 2006

JON W. DUDAS
*Director of the United States Patent and Trademark Office*